(12) United States Patent
Huang

(10) Patent No.: US 8,941,895 B2
(45) Date of Patent: Jan. 27, 2015

(54) SCANNING DEVICE

(71) Applicant: Hon Hai Precision Industry Co., Ltd., New Taipei (TW)

(72) Inventor: Yung-Lun Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/972,834

(22) Filed: Aug. 21, 2013

(65) Prior Publication Data

US 2014/0218776 A1 Aug. 7, 2014

(30) Foreign Application Priority Data

Feb. 4, 2013 (TW) .............................. 102104130 A

(51) Int. Cl.
*H04N 1/036* (2006.01)
(52) U.S. Cl.
CPC ...................................... *H04N 1/036* (2013.01)
USPC .......................................... 358/484; 358/474
(58) Field of Classification Search
CPC .......... H04N 5/23232; H04N 5/23293; H04N 5/2621; H04N 5/367; H04N 5/372; H04N 5/374; H04N 7/181; H04N 7/183
USPC ......... 358/474, 498, 473, 475, 494, 1.15, 484
See application file for complete search history.

(56) References Cited

U.S. PATENT DOCUMENTS

| | | | | |
|---|---|---|---|---|
| 5,514,861 | A * | 5/1996 | Swartz et al. ............ | 235/462.44 |
| 6,788,401 | B1 * | 9/2004 | Kitabayashi et al. ......... | 356/124 |
| 6,918,542 | B2 * | 7/2005 | Silverbrook et al. ......... | 235/494 |
| 7,768,676 | B2 * | 8/2010 | Kimura et al. ................ | 358/474 |
| 8,422,095 | B2 * | 4/2013 | Huang .......................... | 358/475 |
| 8,471,966 | B2 * | 6/2013 | Huang .............................. | 349/9 |
| 8,633,505 | B2 * | 1/2014 | Huang ............................ | 257/98 |

* cited by examiner

*Primary Examiner* — Negussie Worku
(74) *Attorney, Agent, or Firm* — Novak Druce Connolly Bove + Quigg LLP

(57) ABSTRACT

A scanning device is capable of scanning both sides of a medium and includes a lens module, an optical-electric coupling unit, and a processor. The lens module faces the medium to be scanned. The optical-electric coupling unit is optically connected to the lens module. The processor is optically connected to the optical-electric coupling unit, and includes a light emitting unit and a light receiving unit. The light beams emitted from the light emitting unit are directed into the lens module through the optical-electric coupling unit, and illuminate the medium to be scanned. The light beams reflected by the medium enter into the optical-electric coupling unit through the optical-electric coupling unit, and then to the light receiving unit. The processor processes the reflected light beams into electrical signals to obtain scanning signals.

12 Claims, 1 Drawing Sheet

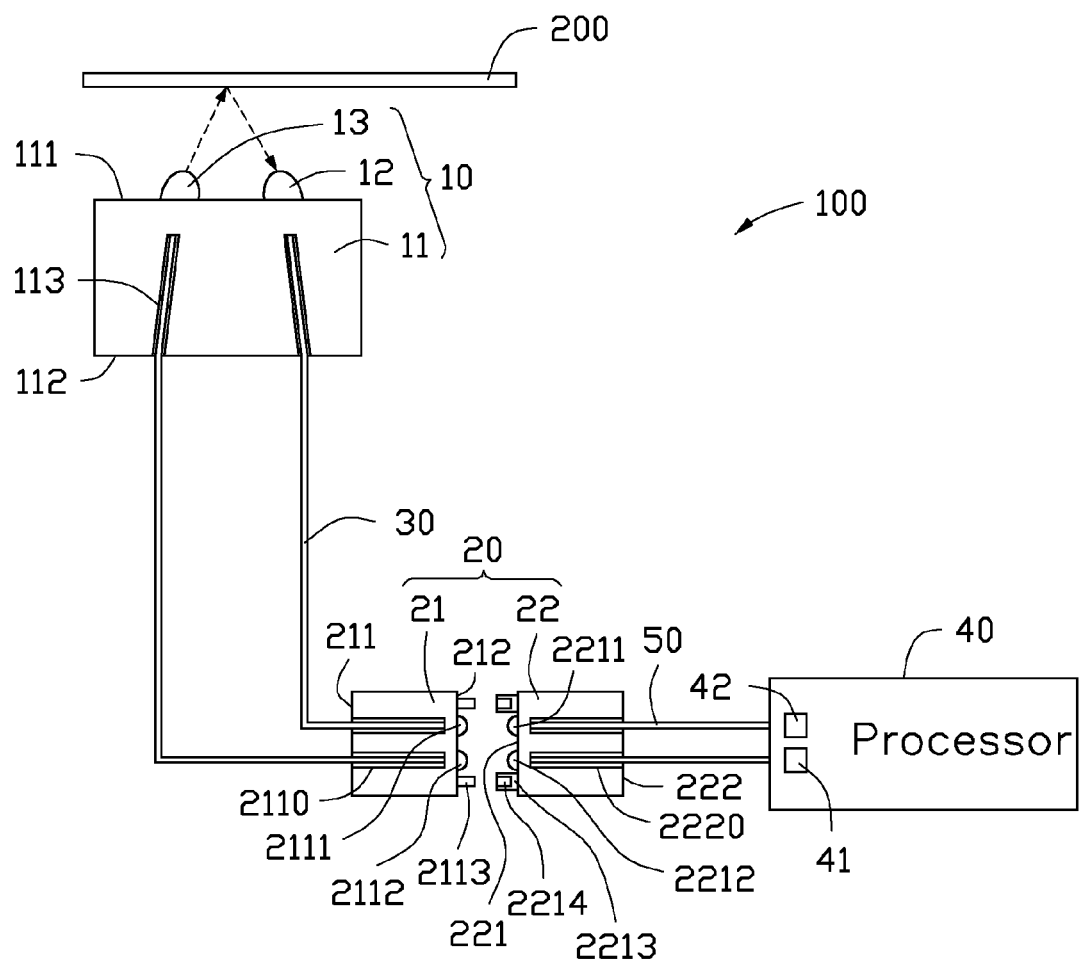

SCANNING DEVICE

BACKGROUND

1. Technical Field

The present disclosure relates to scanning devices, and particularly to a scanning device having optical transmitter.

2. Description of Related Art

Scanning device are computer peripherals for creating digital images from documents in both the home and the office. An image forming subsystem, such as that of charged couple devices (CCDs) and lenses in combination with an illumination source, sits in a stationary position and scans an image as a sheet of paper is moved past the CCDs, through narrow transport paths, by a paper transport mechanism. However, in some cases, the scanning device has two CCDs, one for imaging the front side of the sheet or document, the other for imaging the rear side of the sheet or document. This is expensive, and increases the size of the scanning device in some configurations.

What is needed therefore is a scanning device which can overcome the above-mentioned limitations.

BRIEF DESCRIPTION OF THE DRAWINGS

The components of the drawing are not necessarily drawn to scale, the emphasis instead being placed upon clearly illustrating the principles of the embodiments of the present disclosure.

The FIGURE is a schematic view of a scanning device, according to an exemplary embodiment, together with an medium.

DETAILED DESCRIPTION

The FIGURE shows a scanning device 100, according to an embodiment. The scanning device 100 is capable of scanning both sides of a medium 200. The scanning device 100 includes a lens module 10, an optical-electric coupling unit 20, two first optical fibers 30, a processor 40, and two second optical fibers 50.

The lens module 10 includes a main body 11, a first light-receiving coupling lens 12, and a first light-emitting coupling lens 13.

The main body 11 is substantially cuboid, and includes an upper surface 111 facing the medium 200 to be scanned, and a lower surface 112 facing away from the upper surface 111. The upper surface 111 is substantially parallel with the lower surface 112. The main body 11 is made of transparent material, such as glass. The first light-receiving coupling lens 12 and the first light-emitting coupling lens 13 are formed on the upper surface 111. In the embodiment, both the first light-receiving coupling lens 12 and the first light-emitting coupling lens 13 are convex lenses and are integrally formed with the main body 11.

The lower surface 112 defines two first receiving holes 113. Each first receiving hole 113 aligns with the first light-receiving coupling lens 12 or the first light-emitting coupling lens 13.

The optical-electric coupling unit 20 includes a first optical-electric coupling element 21 and a second optical-electric coupling element 22 detachably connected to the first optical-electric coupling element 21.

The first optical-electric coupling element 21 includes a first surface 211 and a second surface 212 facing away from the first surface 211. The first surface 211 defines two second receiving holes 2110. A second light-receiving coupling lens 2111 and a second light-emitting coupling lens 2112 are formed on the second surface 212. In the embodiment, the first optical-electric coupling element 21 is also made of transparent material. Both the second light-receiving coupling lens 2111 and the second light-emitting coupling lens 2112 are convex lenses and are integrally formed with the first optical-electric coupling element 21. The first optical-electric coupling element 21 includes two position plugs 2113 substantially perpendicularly extending outward from the second surface 212. Both the second light-receiving coupling lens 2111 and the second light-emitting coupling lens 2112 are located between the two position plugs 2113.

One end of each first optical fiber 30 is received in the first receiving hole 113, and the other end of each first optical fiber 30 is received in the second receiving hole 2110. As such, the lens module 10 is optically connected to the first optical-electric coupling element 21 through the two first optical fibers 30.

The second optical-electric coupling element 22 includes a third surface 221 facing the second surface 212, and a fourth surface 222 facing away from the third surface 221. The fourth surface 222 defines two third receiving holes 2220. A third light-receiving coupling lens 2211 and a third light-emitting coupling lens 2212 are formed on the third surface 221. In the embodiment, the second optical-electric coupling element 22 is made of transparent material. Both the third light-receiving coupling lens 2211 and the third light-emitting coupling lens 2212 are convex lenses and are integrally formed with the second optical-electric coupling element 22. The second optical-electric coupling element 22 includes two position posts 2213 substantially perpendicularly extending outward from the third surface 212. Both the third light-receiving coupling lens 2211 and the third light-emitting coupling lens 2212 are located between the two position posts 2213. Each position post 2213 defines a position hole 2214 corresponding to a position plug 2113.

When assembling, the position plugs 2113 are inserted into the position holes 2214 as a pinch fit to firmly attach the first optical-electric coupling element 21 to the second optical-electric coupling element 22, with the second light-receiving coupling lens 2111 and the second light-emitting coupling lens 2112 respectively aligning with the third light-receiving coupling lens 2211 and the third light-emitting coupling lens 2212.

The processor 40 includes a light emitting unit 41 and a light receiving unit 42. In the embodiment, the light emitting unit 41 is a laser diode. The light receiving unit 42 is a photo diode.

One end of each second optical fiber 50 is received in the third receiving hole 2220, and the other end of each second optical fiber 50 is connected to the light emitting unit 41 or the light receiving unit 42. As such, the optical-electric coupling unit 20 is optically connected to the processor 40 through the two second optical fibers 50.

In use, light beams emitted from the light emitting unit 41 are directed into the third light-emitting coupling lens 2212 through a second optical fiber 50, and then enter into a first optical fiber 30 through the second light-emitting coupling lens 2112, and then illuminate the medium 200. The medium 200 reflects the light beams emitted from the light emitting unit 41 into the other first optical fiber 30 through the first light-receiving coupling lens 12, the reflected light beams then enter into the other second optical fiber 50 through the second light-receiving coupling lens 2111 and the third light-receiving coupling lens 2211, and are finally received by the light receiving unit 42. The processor 40 processes the reflected light beams as optical signals received by the light receiving unit 42 and converts them into electrical signals to obtain scanning signals.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A scanning device configured to scan an medium, comprising:
   a lens module for facing the medium to be scanned;
   an optical-electric coupling unit optically connected to the lens module; and
   a processor optically connected to the optical-electric coupling unit, and comprising a light emitting unit and a light receiving unit, wherein light beams emitted from the light emitting unit are directed into the lens module through the optical-electric coupling unit, and illuminate the medium to be scanned, the light beams reflected by the medium enter into the optical-electric coupling unit through the optical-electric coupling unit, and then to the light receiving unit, the processor processes the reflected light beams as optical signals received by the light receiving unit and converts the optical signals into electrical signals to obtain scanning signals.

2. The scanning device of claim 1, wherein the optical-electric coupling unit comprises a first optical-electric coupling element and a second optical-electric coupling element detachably connected to the first optical-electric coupling element.

3. The scanning device of claim 2, comprising two first optical fibers, wherein the lens module is optically connected to the first optical-electric coupling element through the two first optical fibers.

4. The scanning device of claim 1, wherein the light emitting unit is a laser diode, the light receiving unit is a photo diode.

5. A scanning device configured to scan a medium, comprising:
   a lens module for facing the medium to be scanned;
   an optical-electric coupling unit optically connected to the lens module; and
   a processor optically connected to the optical-electric coupling unit, and comprising a light emitting unit and a light receiving unit, wherein light beams emitted from the light emitting unit are directed into the lens module through the optical-electric coupling unit, and illuminate the medium to be scanned, the light beams reflected by the medium enter into the optical-electric coupling unit through the optical-electric coupling unit, and then to the light receiving unit, the processor processes the reflected light beams as optical signals received by the light receiving unit and converts the optical signals into electrical signals to obtain scanning signals;
   wherein the optical-electric coupling unit comprises a first optical-electric coupling element and a second optical-electric coupling element detachably connected to the first optical-electric coupling element;
   two first optical fibers, wherein the lens module is optically connected to the first optical-electric coupling element through the two first optical fibers;
   wherein the lens module comprises a main body, a first light-receiving coupling lens, and a first light-emitting coupling lens, the main body comprises an upper surface for facing the medium and a lower surface facing away from the upper surface, the first light-receiving coupling lens and the first light-emitting coupling lens are formed on the upper surface, the lower surface defines two first receiving holes, each first receiving hole aligns with the first light-receiving coupling lens or the first light-emitting coupling lens, the first optical-electric coupling element comprises a first surface, the first surface defines two second receiving holes, one end of each first optical fiber is received in the first receiving hole, and the other end of each first optical fiber is received in the second receiving hole.

6. The scanning device of claim 5, wherein both the first light-receiving coupling lens and the first light-emitting coupling lens are convex lenses and are integrally formed with the main body.

7. The scanning device of claim 5, wherein the first optical-electric coupling element comprises a second surface facing away from the first surface, the first optical-electric coupling element comprises a second light-receiving coupling lens and a second light-emitting coupling lens formed on the second surface, the second optical-electric coupling element comprises a third surface facing the second surface, the second optical-electric coupling element comprises a third light-receiving coupling lens and a third light-emitting coupling lens formed on the third surface, the second light-receiving coupling lens and the second light-emitting coupling lens respectively aligns with the third light-receiving coupling lens and the third light-emitting coupling lens.

8. The scanning device of claim 7, wherein both the second light-receiving coupling lens and the second light-emitting coupling lens are convex lenses and are integrally formed with the first optical-electric coupling element.

9. The scanning device of claim 7, comprising two second optical fibers, wherein the second optical-electric coupling element is optically connected to the processor through the two second optical fibers.

10. The scanning device of claim 9, wherein the second optical-electric coupling element comprises a fourth surface facing away from the third surface, the fourth surface defines two third receiving holes, one end of each second optical fiber is received in the third receiving hole, and the other end of each second optical fiber is connected to the light emitting unit or the light receiving unit.

11. The scanning device of claim 7, wherein the first optical-electric coupling element includes two position plugs substantially perpendicularly extending outward from the second surface, the second optical-electric coupling element comprises two position posts substantially perpendicularly extending outward from the third surface, each position post defines a position hole corresponding to a position plug, the position plugs are inserted into the position holes to attach the first optical-electric coupling element to the second optical-electric coupling element.

12. The scanning device of claim 7, wherein both the third light-receiving coupling lens and the third light-emitting coupling lens are convex lenses and are integrally formed with the second optical-electric coupling element.

* * * * *